US008756175B1

(12) United States Patent
Szegedy

(10) Patent No.: US 8,756,175 B1
(45) Date of Patent: Jun. 17, 2014

(54) ROBUST AND FAST MODEL FITTING BY ADAPTIVE SAMPLING

(75) Inventor: Christian Szegedy, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/402,105

(22) Filed: Feb. 22, 2012

(51) Int. Cl.
*G06F 15/18* (2006.01)

(52) U.S. Cl.
USPC .......................................................... 706/12

(58) Field of Classification Search
CPC combination set(s) only.
See application file for complete search history.

(56) References Cited

U.S. PATENT DOCUMENTS

| 7,739,644 | B1 * | 6/2010 | Chong et al. ................... 716/119 |
| 7,933,847 | B2 | 4/2011 | Andrew et al. |
| 7,966,595 | B1 * | 6/2011 | Chong et al. ................... 716/118 |
| 8,028,263 | B2 * | 9/2011 | Chong et al. ................... 716/119 |
| 8,572,540 | B2 * | 10/2013 | Chong et al. ................... 716/118 |

OTHER PUBLICATIONS

Andrew NG, Feature Selection, L1 vs. L2 Regularization, and Rotational Invariance, Apr. 2005, 20 pages.
C.H. Still, The Parallel BFGS Method for Unconstrained Minimization, 1991, pp. 347-354.
Quoc V. Le, Jiquan Ngiam, Adam Coates, Abhik Lahiri, Bobby Prochnow, Andrew Y. Ng, on Optimization Methods for Deep Learning, 2011, 8 pages.
Richard H. Byrd, Peihuang Lu, Jorge Nocedal and Ciyou Zhu, A Limited Memory Algorithm for Bound Constrained Optimization, 1994, 25 pages.
Wilson X. Wen, Andrew Jennings, Parallel Distributed Belief Networks That Learn, 1991, pp. 1210-1215.
X. Chen, A Parallel BFGS-SQP Method for Stochastic Linear Programs, 1995, 8 pages.

* cited by examiner

*Primary Examiner* — Michael B Holmes
(74) *Attorney, Agent, or Firm* — Fish & Richardson P.C.

(57) ABSTRACT

Aspects of the present disclosure relate generally to model fitting. A target model having a large number of inputs is fit using a performance model having relatively few inputs. The performance model is learned during the fitting process. Optimal optimization parameters including a sample size, a damping factor, and an iteration count are selected for an optimization round. A random subset of data is sampled based on the selected sample size. The optimization round is conducted using the iteration count and the sampled data to produce optimized parameters. The performance model is updated based on the performance of the optimization round. The parameters of the target model are then updated based on the damping factor and the parameters computed by the optimization round. The aforementioned steps are performed in a loop in order to obtain optimized parameters and fit of the data to the target model.

22 Claims, 2 Drawing Sheets

ROBUST AND FAST MODEL FITTING BY ADAPTIVE SAMPLING

BACKGROUND

One objective of model fitting is to tune the parameters of a model in order to fit some existing data, such as a training set, to either perform regression or classification, and to predict the function value at inputs not present in the training set. Model fitting is a crucial and often very time consuming component of machine-learning and forecasting algorithms. Example applications of model fitting may include image classification such as where the model is fitted to label a set of pictures based on an already labeled subset of the images. In this case, the application may learn to detect features and use the detected features to identify whether a picture belongs to a class. In general this has several practical applications, such as handwriting recognition, automatic labeling for search, filtering unwanted results, etc.

Another example application of model fitting may include natural language processing. In this example, classifying sound samples may be used to generate automated subtitles, translations, label sound/music files for search or filter them. Speech recognition can also be used to control devices.

A further example application of model fitting may include spam filtering in texts. For example, a model identifying spam messages may need to be tuned in order to classify new messages for automatic spam filtering.

Still another example application of model fitting may include tracking advertisements by click through rates in order to create predictions for online serving of advertisements.

Another example application of model fitting may include web traffic forecasting such as that used to estimate the amount of traffic on a website given a set of circumstances. This can be used for better resource allocation and also for inventory management of advertisement.

Yet another example application of model fitting may include product recommendation systems including those that provide suggested media, search information, or advertisements to users based on a browsing or purchase history The above examples are only a small selection of where model-fitting is widely used. In addition supervised training for classification, model-fitting may also be used for unsupervised learning, where the task is to learn a sparse representation of the identity function on the training set. Some model fitting techniques may also utilize additional noise injection to create more robust models. Unsupervised learning may be useful if the number of unlabeled examples greatly exceeds that of the labeled examples. Supervised learning may typically be used as pre-training before a subsequent supervised learning phase. This can both improve the training speed and the generalization error.

Often the whole training set is too large to evaluate the objective function using the whole training set. Sometimes it is even infinite, as training examples may be generated on the fly. If it is not technically feasible to control the selection of the training examples, then the problem may be referred to as online training.

Most model fitting applications are based on sampling. Already the use of a training set can be regarded as a form of sampling. The most primitive form of sampling is the use of stochastic gradient without batching. This algorithm loops over all examples one-by-one and updates the objective immediately by adding a small correction based on the example to the model parameters. This method is one of the cornerstones of all machine learning applications. An improved version of stochastic gradient is using mini-batching, a randomly chosen subset of training examples is considered and the gradient is computed using the subset rather than a single individual training example. In the case of gradient descent, which is a first order method, this results in a modest improvement mostly due to improved memory management as the gradients would be added up and averaged over the long run.

Higher order methods, such as pseudo-Newton methods, cannot operate on single instances without a significant loss of performance. Their strength is to approximate the objective by a quadratic form and minimize this approximation subsequently. A prominent example of second order, or quasi-Newton, optimization in machine learning is the limited-memory Broyden-Fletcher-Goldfarb-Shanno (L-BFGS) method which manages a limited second order approximation of the model during optimization.

In the case of quasi-Newton methods, batching affects the performance of the algorithms profoundly. Theoretically, second order methods would require a test set that give a good approximation of the Hessian of the objective function. In praxis, however there is a tradeoff between accuracy of the estimation and computational costs. Better approximation of the Hessian can be obtained by increasing sample sizes, but the effect of a more accurate fit will not improve the performance significantly in the beginning of the optimization. As the optimization procedure progresses, larger and larger sample sizes may be required to get optimal learning performance.

Second order methods require larger batch sizes in general, and the choice of a reasonable batch size can affect the overall performance of the learning process drastically. However the optimum batch size depends on a various factors and its value changes considerably as training proceeds, so there is not one-fit-for-all solution.

Typical strategies for model fitting may involve a constant batch size or changing the batch size by some prescribed function which is empirically determined and tuned to the specific problem. A poorly tuned batch size (or batch size selection mechanism) may result in oscillating behaviors and inferior quality solutions. In addition, an ad hoc batch-sizing function may be well tuned for a specific setting, but the optimal sampling depends on the features of the model employed and as well as on the underlying optimization method. If either the algorithm or the training set changes significantly, then previously close-to optimal sampling may not converge for the changed situation. These strategies may also result in software-engineering issues such as hand-tuned, hard coded parameters that can seriously affect the reusability, refactorability and flexibility of the implementation.

SUMMARY

One aspect of the disclosure provides a method for determining a set of optimized target parameters for a target model and training data. The method includes selecting a set of optimization parameters including a sample size, a damping factor, and an iteration value. The method also includes sampling the training data based on the selected sample size. A processor performs an optimization round including optimizing an objective function for the sampled training data and the selected iteration value. The method also includes generating a performance model associated with a set of performance parameters based on the optimization round, the selected iteration value, the selected sample size, and the damping factor. A processor determines a generalization error for the optimization round. The method also includes analyzing the generalization error by evaluating the target model on a second sample of the training data. The method includes updating the set of performance parameters based on the analysis of the generalization error to obtain a set of updated performance parameters and updating a set of target parameters based on the performance model, the set of updated performance parameters, and the generalization error to obtain a set of optimized target parameters for the sampled training data.

In one example, the selected sample size is less than a size of the second sample of the training data. In another example, the method also includes selecting the second sample of the training data such that the second sample of the training data does not include the sampled training data. In another example, the set of target parameters is updated based on a formula: $P_{i+1}=(1-d)p_i+d(p'_i-p_i)$, where $p_i$ is a vector of parameter values before an iteration round i, d is the selected damping factor, $p'_i$ are the set of performance parameters. In another example, selecting the set of optimization parameters further includes selecting a learning rate and performing the optimization round includes optimizing the learning rate for the objective function based on a gradient descent optimization method. In another example, the training data includes handwriting samples and the target model is directed to handwriting recognition. In another example, the training data includes speech samples and the target model is directed to speech recognition. In another example, the training data includes click through rates and the target model is directed to tracking advertisements. In another example, the training data includes text samples and the target model is directed to spam filtering in text.

In one example, the objective function is optimized by the processor in the optimization round according to the function: $F=g(m)+1/N\Sigma_i f(m,x_i)$, where m is a vector of the set of target model parameters, and $x_i$ are instances of the sampled training data, the function "f" is a loss function, and "g" is a regularization term which depends on the target model. In this example, the generalization error may also be determined based on an overall objective generalization function: $F(m,s)+e(|s|,F(m,s)+e(|s|,F(m,s)-F(m',s),r(m),d)$, where s is the selected sample size, e represents an estimated error function for the sampled training data, r is a regularization cost, and d is the selected damping factor. Alternatively, the method may also include the steps of a) selecting a next sample of training data based on the selected sample size; b) performing a next optimization round including optimizing an objective function for the sampled training data and the selected iteration value; c) generating a next performance model associated with a set of next performance parameters based on the next optimization round, the selected iteration value, the selected sample size and the damping factor; d) determining a next generalization error for the next optimization round; e) analyzing the next generalization error by evaluating the target model on another sample of the training data; f) updating the set of next performance parameters based on the analysis of the next generalization error; and g) updating the updated set of target parameters based on the next performance model, the set of next performance parameters, and the next generalization error to obtain a set of optimized target parameters for the sampled training data and the next sampled training data. In this alternative, the method may also include repeating steps a) through g) until a threshold value indicative of a predetermined generalization error is reached. The method may also include repeating steps a) through g) until a threshold value indicative of a specific form of the objective function identified during the next optimization round is reached. The method may include repeating steps a) through g) until a threshold amount of time has passed.

Another aspect of the disclosure provides a method for determining a set of optimized target parameters for a target model and training data. The method includes The method includes selecting a set of optimization parameters. The method also includes sampling a first subset of the training data and performing an optimization round including optimizing an objective function for the first subset training data and the set of optimization parameter. The method also includes generating a performance model associated with a set of performance parameters based on the optimization round. The method also includes determining a generalization error for the optimization round and analyzing the generalization error by evaluating the target model on a second subset of the training data. The method includes updating the set of performance parameters based on the analysis of the generalization error to obtain a set of updated performance parameters and updating a set of target parameters based on the performance model, the set of updated performance parameters, and the generalization error to obtain a set of optimized target parameters for the first subset of the training data.

A further aspect of the disclosure provides a device for determining a set of optimized target parameters for a target model and training data. The device includes memory storing the training data, the set of target parameters, and a target models. The device also includes a processor coupled to the memory. The processor is configured to select a set of optimization parameters including a sample size, a damping factor, and an iteration value. The processor is also configured to sample the training data based on the selected sample size and perform an optimization round including optimizing an objective function for the sampled training data and the selected iteration value. The processor is configured to generate a performance model associated with a set of performance parameters based on the optimization round, the selected iteration value, the selected sample size, and the damping factor. The processor is also configured to determine a generalization error for the optimization round and analyze the generalization error by evaluating the target model on a second sample of the training data. The processor is configured to update the set of performance parameters based on the analysis of the generalization error to obtain a set of updated performance parameters and to update the set of target parameters based on the performance model, the set of updated performance parameters, and the generalization error to obtain a set of optimized target parameters for the sampled training data.

In one example, the processor is also configured to select the second sample of the training data such that the second sample of the training data does not include the sampled training data. In another example, the processor is also configured to optimize objective function according to the function: $F(m)=g(m)+1/N\Sigma_i f(m,x_i)$, where m is a vector of the set of target model parameters, and $x_i$ are instances of the sampled training data, the function "f" is a loss function, and "g" is a regularization term which depends on the target model. In one alternative, the processor is also configured to determine the generalization error according to an overall objective generalization function: $F(m,s)+e(|s|,F(m,s)-F(m',s),r(m),d)$, where s is the selected sample size, e represents an estimated error function for the sampled training data, r is a regularization cost, and d is the selected damping factor.

In one example, the processor is configured to a) select a next sample of training data based on the selected sample size; b) perform a next optimization round including optimizing an objective function for the sampled training data and the selected iteration value; c) generate a next performance model associated with a set of next performance parameters based on the next optimization round, the selected iteration value, the selected sample size and the damping factor; d) determine a next generalization error for the next optimization round; e) analyze the next generalization error by evaluating the target model on another sample of the training data; f) update the set of next performance parameters based on the analysis of the next generalization error; and g) update the updated set of target parameters based on the next performance model, the set of next performance parameters, and the next generalization error to obtain a set of optimized target parameters for the sampled training data and the next sampled training data. In this example, the processor may be configured to repeat steps a) through g) until a threshold value indicative of a predetermined generalization error is reached. In an alternative, the processor may be configured to repeat steps a) through g) until a threshold value indicative of a specific form of the objective function identified during the next optimization round is reached. In another alternative, the processor may be configured to repeat steps a) through g) until a threshold amount of time has passed.

DETAILED DESCRIPTION

This disclosure describes an automatic system that addresses the above problems allowing flexibility and reusability of the implementation while providing good performance in a wide range of settings. This cuts down implementation time, improves performance without manual tweaking of the parameters and results in more robust and flexible implementation.

Machine learning (model-fitting) may be used to monitor and model the performance of an underlying optimization algorithm and to orchestrate the sampling and additional optimization parameters to optimize for maximum performance under the specific circumstances. This is possible since the performance of the algorithm can be described by a model in a very low dimensional space and so the overhead of machine learning on that space is negligible to the cost of the original problem.

The features described herein are flexible enough to allow any objective function that minimizes the average of a function over a training set plus a regularization term together with an iterative optimizer plugin. Although optimizers whose performance has not been characterized properly by a performance model would require longer training than an optimizer which does have a previously trained performance model, this training is fully automatic, the result of which can be saved for further use with other models as well.

The features disclosed herein may be used on both supervised and unsupervised training instances, for example, for handwriting recognition using a second order optimizer based on the L-BFGS algorithm, but may also be applied to larger classes of machine-learning problems, such as the various modeling applications described above.

Figure 1:
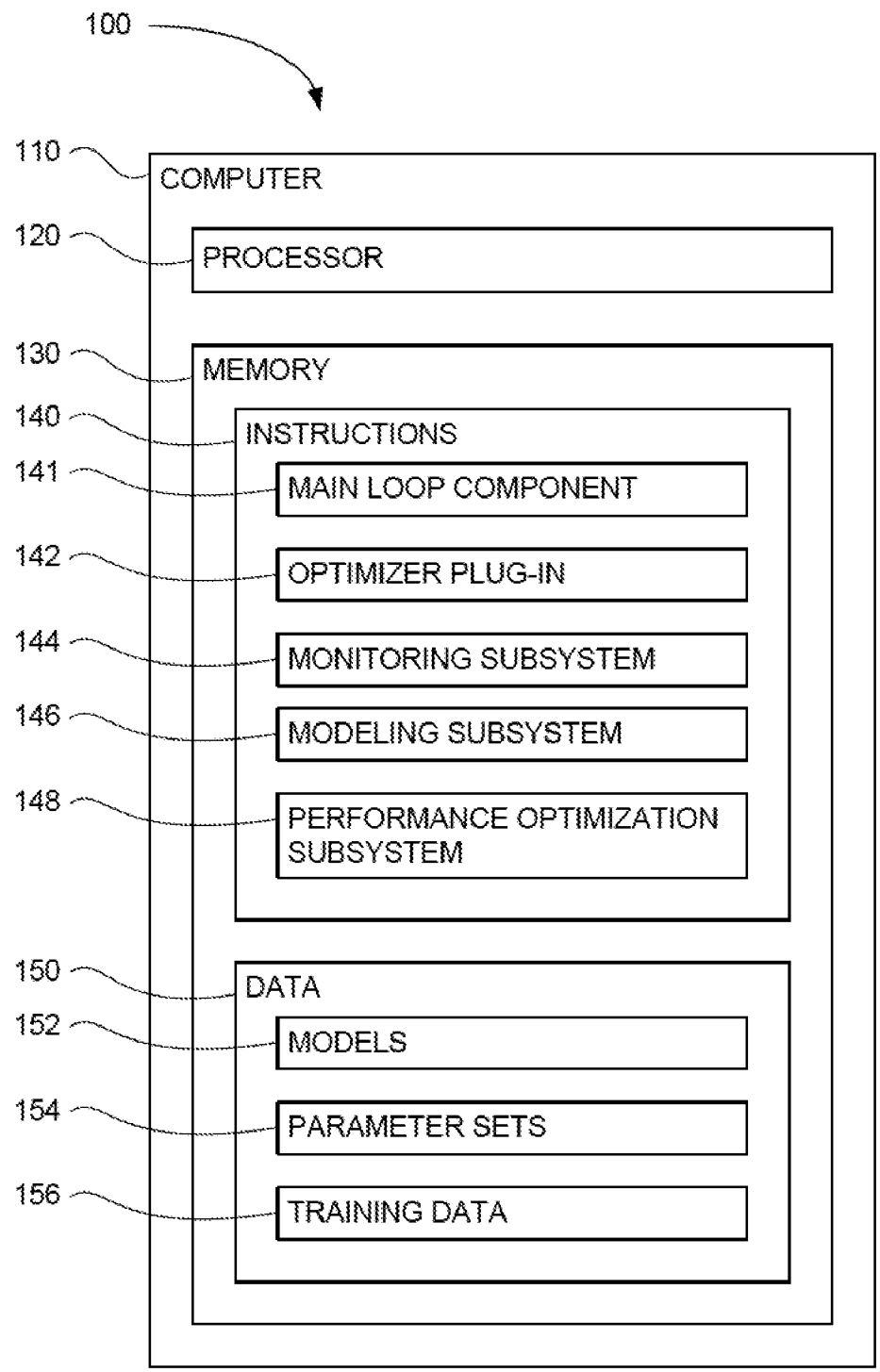
FIG. 1 is a functional diagram of a system in accordance with aspects of the disclosure.

As shown in FIG. 1, a system 100 for use with an embodiment includes a computer 110 containing a processor 120, memory 130 and other components typically present in general purpose computers.

The memory 130 stores information accessible by processor 120, including instructions 140, and data 150 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 140 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 150 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated controller such as an ASIC or other hardware-based processor. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

Instructions 140 may include a set of components. For example, a main loop component 141 which may organize and run the optimization process. For example, the main loop component may control the other components of the optimization process such as an optimizer plug-in 142, a monitoring subsystem 144, a modeling subsystem 146, and a performance optimization subsystem 148. The optimizer plug-in 142 may include an arbitrary optimizer that can optimize an objective function over a prescribed set of instances. The optimizer plug-in may be used by the computer 110 as a standalone (black-box) component. The monitoring subsystem 144 may monitor the resource usage and quality of the result of the optimization plug-in. The monitoring subsystem may also provide input to the performance modeling subsystem 146. The performance modeling subsystem may perform model fitting to forecast performance as a function of various model parameters. The performance optimization subsystem 148 may select the optimum parameters based on a current performance model.

Data 150 may include models 152. The models may include a target model which may be used to examine data for various applications, such as handwriting recognition, speech recognition, tracking Internet-based advertisements, spam filtering in text, etc. as described above. The target model may have a very large number of parameters to be fitted, such as thousands or even billions, depending upon the application.

Although the above examples of target models seem to cover a huge domain, model fitting problem formulations may share a set of common features that can be exploited in general. An objective function (to be minimized) can be written in the form: $F(m)=1/N\Sigma_i f(m,x_i)$, where m is the vector of model parameters and $x_0, \ldots, x_{0i}, \ldots, x_N$ are the instances of the training set. The function "$f$" is a loss function and "g" is a regularization term which depends on the target model. In general, "1" may provide a qualitative measurement of the model fit over a set of inputs and may not be easily minimized explicitly. The loss function may be non-convex, and iterative methods may be required for its minimization. Examples of often used convex loss functions may include squared loss, absolute, loss, logistic loss, and softmax loss, although other loss functions may also be used.

Models 152 may also include performance models that are generated based on the performance of an optimization round as described below. The performance models may have few inputs, for example 10 parameter, depending on the performance features being used. Thus, the performance model may have relatively few parameters compared to the target model. The dimensionality of the input space and parameter space may not necessarily be the same. The performance model may have both low dimensional input and parameter space at the same time and the target model may have a large dimensional input space and a very large dimensional parameter space.

The models may also include an overall objective generalization function: $F(m,s)+e(|s|,F(m,s)-F(m',s),r(m),d)$ used to determine a generalization error. In this example, the error function "e" may depend only on a sample size $|s|$ (the size of a batch of training data being evaluated), regularization cost r, and a damping factor d (a value between 0 and 1). In one example, the regularization cost may include a cost added to the model that punishes large parameters, such as the squared sum of parameter values, or non-sparse parameter values, such as the sum of absolute values of Kullback-Leibler divergence of the parameters. Machine learning techniques typically use regularization cost functions to make the training process convergent and stable. In addition to those described above, various regularization cost functions may be used.

Data 150 may also include parameter sets 154. The parameter sets may include target model parameters (the parameters for the target model). Computing optimal values for these parameters is the goal of system 100. The parameter sets may also include performance model parameters that are learned during the optimization round (described in more detail below) in order to model the performance of the optimizer plug-in on the target model. The parameter sets may also include optimizer parameters that affect the performance of the optimization step of the optimizer while fitting the target model, such as a learning rate. The optimizer parameters may also be a subset of the input to the performance model.

The computer 110 may also access training data 156. The training data may include any information that may be used by the system 100 to fit to a target model. For example, if the target model is directed to handwriting recognition, the training data may include handwriting samples. If the target model is directed to speech recognition, the training data may include speech samples. If the target model is directed to tracking Internet-based advertisements, the training data may include click-through rates, or how often an advertisement is displayed with respect to the number of times it is selected by a user. If the target model is directed to spam filtering in text, the training data may include text samples. Various other models and training data types may also be used. This training data may be stored locally at computer 110 or may be stored at a remote location, such as at a device and/or at different physical geographical or network location.

In addition to the operations described below and illustrated in the figures, various operations will now be described. It should also be understood that the following operations do not have to be performed in the precise order described below. Rather, various steps may be handled in a different order or simultaneously. Steps may also be omitted or added unless otherwise stated herein.

Before fitting the training data to the target model, the computer's processor calls the main loop component to select a set of optimization parameters. These initial values may be selected based on the target model, for example they may be default values or values provided by a user of the system. In one example, the optimization parameters may include a sample size (the size of the batch of the training data), a damping factor (a value between 0 and 1), and an iteration count, though other optimization parameters may also be used. For example, any parameters passed through the optimizer plug-in, such as the learning rate, may also be used.

The training data is then sampled based on the selected sample size. For example, the computer may select a random batch of the size determined by the selection step. In another example, the computer may simply read the next batch of that size, in case of online learning.

The computer then performs an optimization round using the optimizer plug-in. For example, an optimization round is performed for the selected number of iterations and the sampled training data. An optimization round may comprise running the selected number of iterations of the optimizer plug-in on the selected sample for the target model. The optimization round may include performing an iterative model fitting method that computes an increasingly accurate model by iteratively updating the model parameters. Examples of typical optimizer methods may include stochastic or gradient descent, conjugated gradient and limited memory Broyden-Fletcher-Goldfarb-Shanno methods, through other methods may also be used.

The performance modeling subsystem may generate and update a performance model based on the results of the optimization round. For example, the inputs to the performance model may include the objective function, the number of iterations per sample, the loss function, the regularization cost function, the learning rate, the selected sample size, and the damping factor. The performance modeling may be used to forecast the expected performance of the system for a given sample size and damping factor.

The performance modeling system may include a low-dimensional machine-learning subsystem that relies on a set of a priori assumptions about the objective function. These assumptions may include, for example, that for a given sample size m, the time spent in any iteration is modeled by $c+bm^\alpha$, where the values c, b, and alpha represent parameters of the performance model. Another assumption may include that for a given sample size and damping factor, the form of the objective function on the sample may satisfy $\log(F(m_i)-F(m'))=a\log(i+k)+c$. In this assumption, m' denotes the argument of the minimum of F over the sample. This choice of model is based on observations of the evolution of the objective over several optimization processes.

Given a time series for a specific sample, a performance model may be constructed using an embedded optimization process. For example, for a given F(m') and k, an optimal a and c may be determined by standard linear regression on the parameters of the performance model on the sample. The linear regression may be wrapped as a function, and an optimization algorithm (e.g., Newton's method or gradient descent) may be used to optimize the overall objective in dependence of F(m') and k, where k is a regularization term. The choice of the starting solution may be crucial. F(m') may be chosen to be somewhat smaller than the minimum of all the subsets of training data evaluated over the training model so far. An incorrect starting value for F(m') may inhibit the convergence of the process.

The overall goal is to determine the target model parameters which minimize the objective function and the loss function "$f$." Because the loss function is evaluated on an unknown set of examples, generalization may also be an issue. For example, if the system overfits to the training set, the performance on the test set may be impaired and may result in higher than necessary loss functions. To study this effect the training set may be subdivided into chunks. A subset of these chunks may then be evaluated to measure the generalization. In general training can be done in several disjoint phases, building on each other. For example, a handwriting recognition tool may have a preset for handwriting that can be optimized on a large set of examples, but it is useful that the training continues even after the tool is purchased in order to adapt to its user. Similar fine-tuning may be employed by speech-recognition tools as well.

Typically, generalization error is handled manually, for example, by having a person directly observing the fit of the sampled data to the target model on a test set hold out from the training. However, the computer may also determine the generalization. To address overfitting, the Performance Modeling Subsystem may utilize the objective generalization function discussed above. An inverse relation between all the parameters of the objective generalization function and the estimated error function may be assumed. One such class of functions to fit over may include $|s|^\alpha \log(F(m,s) F(m',s))^\beta r(m)^\gamma d^\delta$ where $\alpha$, $\beta$, $\gamma$, and $\delta$ are negative numbers.

The output of the performance modeling subsystem may include a predicted runtime per iteration, an overall change of the target model over that portion of the training set which has been sampled, as well as a generalization error or variance value.

During the optimization round, the monitoring subsystem may record the running time and memory necessary to perform each iteration of the optimization process with the selected batch size. The performance of the optimization process may be primarily determined by these factors. Once an optimization round is completed, the monitoring subsystem also analyses the generalization by evaluating the target model on another larger sample. In this step, the larger sample may include none, some, or all of the data in the sample tested during the optimization round. The results from the performance monitoring system are then used to update the parameters of the performance model using machine learning methods.

The target model parameters may then be updated by the performance optimization subsystem. This subsystem may determine the optimal target model parameters based on the sample size, the number of iterations, and the selected damping factor. In one example, the computer may use the formula $P_{i+1}=(1-d)p_i+d(p'_i-p_i)$, to determine the optimal target model parameters. The value $p_i$ may be the vector of parameter values before round i and d is the selected damping factor. $p'_i$ are the parameters computed by the optimization step and d is the selected damping factor determined in the selection step.

The performance optimization subsystem may use an embedded (two level) optimization. The first level may take the sample size as a parameter and apply it to a second function that optimizes over the number of iterations and the damping factor for a fixed sample size. This allows for estimation of the variance and the objective function $(\Delta F)/(\Delta t+k)$ is minimized. This estimate may include the generalization error and may be based on the performance model and performance model parameters generated by the performance modeling subsystem and performance monitoring subsystem. The regularization term k is an estimation of the additional cost, including, for example time, memory, bandwidth, processing power, etc., of starting a new optimization round and a realistic value prevents the optimizer selecting iteration counts that are too low.

The steps above are an example of a single optimization process. These steps may be repeated in order to determine the optimized target model parameters. In one example, the optimization process may be stopped by a person operating the system. In another example, once the modeling has reached some threshold, such as a minimum generalization value, a specific form of the loss, a specific form of the objective function, or some maximum amount of time, the process may be stopped and the optimized target parameters for that threshold may be determined. In some examples, these values may be monitored by the monitoring subsystem.

Figure 2:
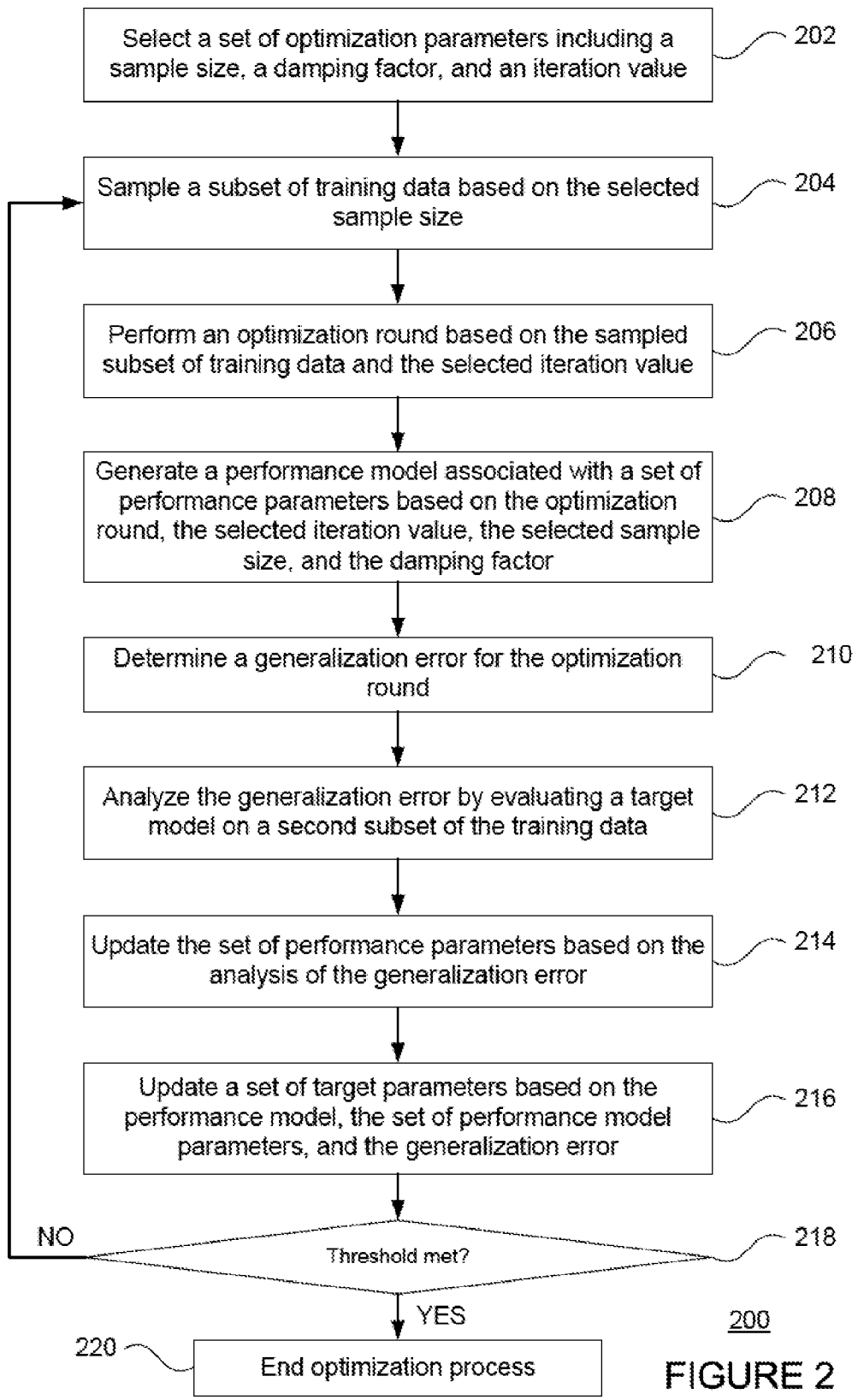
FIG. 2 is an example flow diagram in accordance with aspects of the disclosure.

An example of the optimization process for optimizing a set of target parameters for training data described above is depicted in flow diagram 200 of FIG. 2. In this example, a set of optimization parameters is selected at block 202. The set of optimization parameters includes a sample size, a damping factor, and an iteration value or iteration count. A subset of the training data is sampled based on the selected sample size at block 204. Next, an optimization round is performed based on the sampled subset of training data at block 206. A performance model associated with a set of performance parameters is generated based on the optimization round, the selected iteration value, the selected sample size and the damping factor at block 208. A generalization error for the optimization round is determined at block 210. The generalization error is analyzed by evaluating the target model on a second subset of the training data at block 212. The set of performance parameters is updated based on the analysis of the generalization error at block 216. A set of target parameters is then updated based on the performance model the set of performance model parameters, and the generalization error at block 216.

The optimization process also determines whether a threshold for terminating the process has been met at block 218. Although this step is depicted as occurring after block 216 in FIG. 2, it will be understood that this determination may be made throughout the process. If the threshold has not been met (or for example, an operator of the system has stopped the process), the process continues at block 202 and a new subset of training data is selected. The process then continues until, at block 218, the threshold has been met (or the operator of the system has stopped the process). Once this has occurred, the process ends at block 220. A this point, the most recently updated set of target parameters are the optimal parameters.

As these and other variations and combinations of the features discussed above can be utilized without departing from the subject matter defined by the claims, the foregoing description of exemplary embodiments should be taken by way of illustration rather than by way of limitation of the subject matter defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for determining a set of optimized target parameters for a target model and training data, the method comprising:
    selecting a set of optimization parameters including a sample size, a damping factor, and an iteration value;
    sampling the training data based on the selected sample size;
    performing, by a processor, an optimization round including optimizing an objective function for the sampled training data and the selected iteration value;
    generating a performance model associated with a set of performance parameters based on the optimization round, the selected iteration value, the selected sample size and the damping factor;
    determining, by the processor, a generalization error for the optimization round;
    analyzing the generalization error by evaluating the target model on a second sample of the training data;
    updating the set of performance parameters based on the analysis of the generalization error to obtain a set of updated performance parameters; and
    updating a set of target parameters based on the performance model, the set of updated performance parameters, and the generalization error to obtain a set of optimized target parameters for the sampled training data.

2. The method of claim 1, wherein the selected sample size is less than a size of the second sample of the training data.

3. The method of claim 1, further comprising selecting the second sample of the training data such that the second sample of the training data does not include the sampled training data.

4. The method of claim 1, wherein the objective function is optimized by the processor in the optimization round according to the function: $F(m)=g(m)+1/N\Sigma_i f(m,x_i)$, where m is a vector of the set of target model parameters, and $x_i$ are instances of the sampled training data, the function "$f$" is a loss function, and "g" is a regularization term which depends on the target model.

5. The method of claim 4, wherein the generalization error is determined based on an overall objective generalization function: $F(m,s)+e(|s|,F(m,s)-F(m',s),r(m),d)$, where s is the selected sample size, e represents an estimated error function for the sampled training data, r is a regularization cost, and d is the selected damping factor.

6. The method of claim 4, further comprising:
    a) selecting a next sample of training data based on the selected sample size;
    b) performing, a next optimization round including optimizing an objective function for the sampled training data and the selected iteration value;
    c) generating a next performance model associated with a set of next performance parameters based on the next optimization round, the selected iteration value, the selected sample size and the damping factor;
    d) determining a next generalization error for the next optimization round;
    e) analyzing the next generalization error by evaluating the target model on another sample of the training data;
    f) updating the set of next performance parameters based on the analysis of the next generalization error; and
    g) updating the updated set of target parameters based on the next performance model, the set of next performance parameters, and the next generalization error to obtain a set of optimized target parameters for the sampled training data and the next sampled training data.

7. The method of claim 6, further comprising repeating steps a) through g) until a threshold value indicative of a predetermined generalization error is reached.

8. The method of claim 6, further comprising repeating steps a) through g) until a threshold value indicative of a specific form of the objective function identified during the next optimization round is reached.

9. The method of claim 6, further comprising repeating steps a) through g) until a threshold amount of time has passed.

10. The method of claim 1, wherein the set of target parameters is updated based on a formula: $P_{i+1}=(1-d)p_i+d(p'_i-p_i)$, where $p_i$ is a vector of parameter values before an iteration round i, d is the selected damping factor, $p'_i$ are the set of performance parameters.

11. The method of claim 1, wherein:
    selecting the set of optimization parameters further includes selecting a learning rate; and
    performing the optimization round includes optimizing the learning rate for the objective function based on a gradient descent optimization method.

12. The method of claim 1, wherein the training data includes handwriting samples and the target model is directed to handwriting recognition.

13. The method of claim 1, wherein the training data includes speech samples and the target model is directed to speech recognition.

14. The method of claim 1, wherein the training data includes click through rates and the target model is directed to tracking advertisements.

15. The method of claim 1, wherein the training data includes text samples and the target model is directed to spam filtering in text.

16. A method for determining a set of optimized target parameters for a target model and training data, the method comprising:
    selecting a set of optimization parameters;
    sampling a first subset of the training data;
    performing an optimization round including optimizing an objective function for the sampled subset of training data and the set of optimization parameters;
    generating a performance model associated with a set of performance parameters based on the optimization round;
    determining a generalization error for the optimization round;
    analyzing the generalization error by evaluating the target model on a second subset of the training data;

updating the set of performance parameters based on the analysis of the generalization error to obtain a set of updated performance parameters; and updating a set of target parameters based on the performance model, the set of updated performance parameters, and the generalization error to obtain a set of optimized target parameters for the first subset of the training data.

17. A device for determining a set of optimized target parameters for a target model and training data, the device comprising:

memory storing the training data, the set of target parameters, and the target model;

a processor coupled to the memory, the processor being configured to:

select a set of optimization parameters including a sample size, a damping factor, and an iteration value;

sample the training data based on the selected sample size;

perform an optimization round including optimizing an objective function for the sampled training data and the selected iteration value;

generate a performance model associated with a set of performance parameters based on the optimization round, the selected iteration value, the selected sample size and the damping factor;

determine a generalization error for the optimization round;

analyze the generalization error by evaluating the target model on a second sample of the training data;

update the set of performance parameters based on the analysis of the generalization error to obtain a set of updated performance parameters; and update the set of target parameters based on the performance model, the set of updated performance parameters, and the generalization error to obtain a set of optimized target parameters for the sampled training data.

18. The device of claim 17, wherein the processor is further configured to select the second sample of the training data such that the second sample of the training data does not include the sampled training data.

19. The device of claim 17, wherein the processor is further configured to optimize objective function according to the function: $F(m)=g(m)+1/N\Sigma_i f(m,x_i)$, where m is a vector of the set of target model parameters, and $x_i$ are instances of the sampled training data, the function "$f$" is a loss function, and "g" is a regularization term which depends on the target model.

20. The device of claim 19, wherein the processor is further configured to determine the generalization error according to an overall objective generalization function: $F(m,s)+e(|s|,F(m,s)-F(m',s),r(m),d)$, where s is the selected sample size, e represents an estimated error function for the sampled training data, r is a regularization cost, and d is the selected damping factor.

21. The device of claim 17, wherein the processor is further configured to:

a) select a next sample of training data based on the selected sample size;

b) perform a next optimization round including optimizing an objective function for the sampled training data and the selected iteration value;

c) generate a next performance model associated with a set of next performance parameters based on the next optimization round, the selected iteration value, the selected sample size and the damping factor;

d) determine a next generalization error for the next optimization round;

e) analyze the next generalization error by evaluating the target model on another sample of the training data;

f) update the set of next performance parameters based on the analysis of the next generalization error; and g) update the updated set of target parameters based on the next performance model, the set of next performance parameters, and the next generalization error to obtain a set of optimized target parameters for the sampled training data and the next sampled training data.

22. The device of claim 21, wherein the processor is further configured to repeat steps a) through g) until a threshold value indicative of a predetermined generalization error is reached.

* * * * *

UNITED STATES PATENT AND TRADEMARK OFFICE
CERTIFICATE OF CORRECTION

Page 1 of 1

PATENT NO. : 8,756,175 B1
APPLICATION NO. : 13/402105
DATED : June 17, 2014
INVENTOR(S) : Christian Szegedy It is certified that error appears in the above-identified patent and that said Letters Patent is hereby corrected as shown below:

In the Claims

In Claim 10, column 12, line 31, please delete:

"$P_{1+1} - (1 - d)p_i + d(p'_i - p_i)$"

and insert

--$P_{1+1} = (1 - d)p_i + d(p'_i - p_i)$--

Signed and Sealed this
Twenty-first Day of October, 2014

Michelle K. Lee
*Deputy Director of the United States Patent and Trademark Office*